United States Patent [19]
Duda

[11] Patent Number: 4,474,340
[45] Date of Patent: Oct. 2, 1984

[54] TAPE LOCK MECHANISM
[75] Inventor: Werner Duda, West Sayville, N.Y.
[73] Assignee: Roe International Inc., Patchogue, N.Y.
[21] Appl. No.: 317,114
[22] Filed: Nov. 2, 1981
[51] Int. Cl.³ .................. B65H 75/30; B65H 75/34
[52] U.S. Cl. .................. 242/84.8; 33/138; 242/107.2
[58] Field of Search .............. 242/107.2, 84.8; 33/138

[56] References Cited

U.S. PATENT DOCUMENTS

| | | | |
|---|---|---|---|
| 2,814,881 | 12/1957 | Ljungberg | 242/84.8 X |
| 3,942,738 | 3/1976 | Rutty | 242/107.2 |
| 4,194,703 | 3/1980 | Roe | 242/107.2 |
| 4,293,058 | 10/1981 | Burton | 242/84.8 X |

FOREIGN PATENT DOCUMENTS 735643 6/1966 Canada .................. 33/138

*Primary Examiner*—John M. Jillions
*Attorney, Agent, or Firm*—Pasquale A. Razzano

[57] ABSTRACT

A steel measuring tape having a plastic casing with the tape coiled around a reel which encloses a recoiling spring. The tape projects through a slot at the bottom of the front wall of the casing, and is withdrawn in the standard manner against the action of the spring. A tape locking mechanism of unique design is positioned on the front face of the casing with a slide which is moved downwardly to lock the tape. An elongated locking strip has its bottom portion positioned directly above the tape, and is preset against the tape and clamps it against the bottom wall of the casing. Two unique mechanisms are disclosed for moving the locking strip to and from the locking position. Each of those mechanisms includes two angular arms which are engaged and elongated to move the locking slide downwardly into locking engagement with the tape.

12 Claims, 8 Drawing Figures

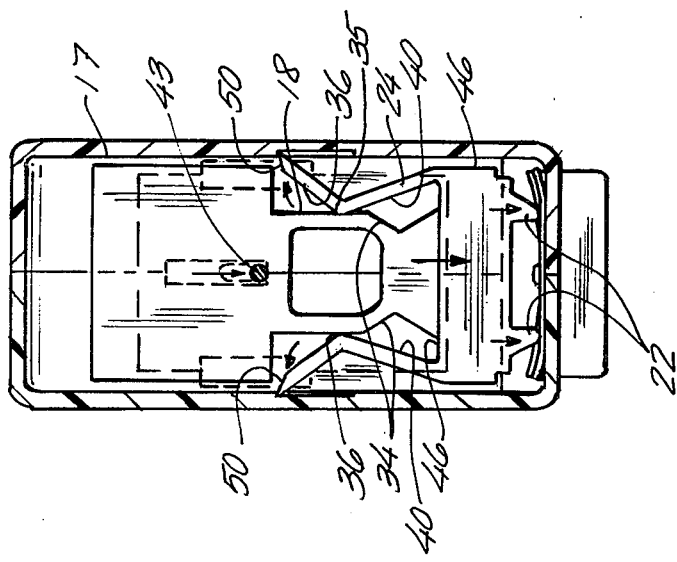

TAPE LOCK MECHANISM

This invention relates to steel measuring tapes of the type which are coiled in a casing around a reel with the reel enclosing a coil spring which rewinds the tape after it has been withdrawn from the casing. The casing is of a known type with parallel side walls and a slot at the bottom of the front wall of the casing and a locking mechanism which is operative to clamp the tape from movement to or from the casing. The locking mechanism is capable of holding the tape firmly, is easily operative, and compact and sturdy. The locking mechanism is operative by moving a slide up and down the front wall of the casing and is operable by the thumb when the casing is held in the hand. It is an object of the present invention to provide an improved locking mechanism of that general type.

Referring to the drawings.

Figure 2:
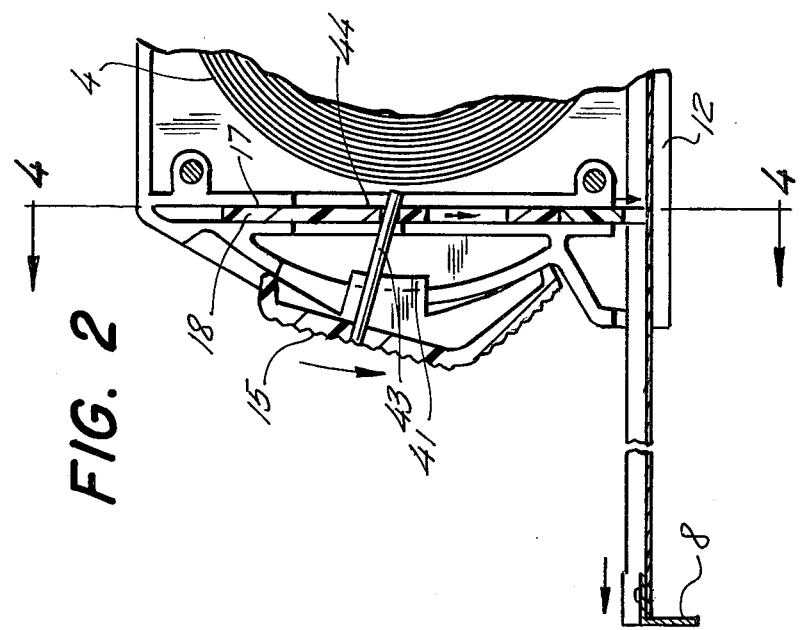
FIG. 2 is a view similar to the left-hand portion of FIG. 1 but showing the locking mechanism engaging the tape when the tape is partially withdrawn from the casing.
Figure 1:
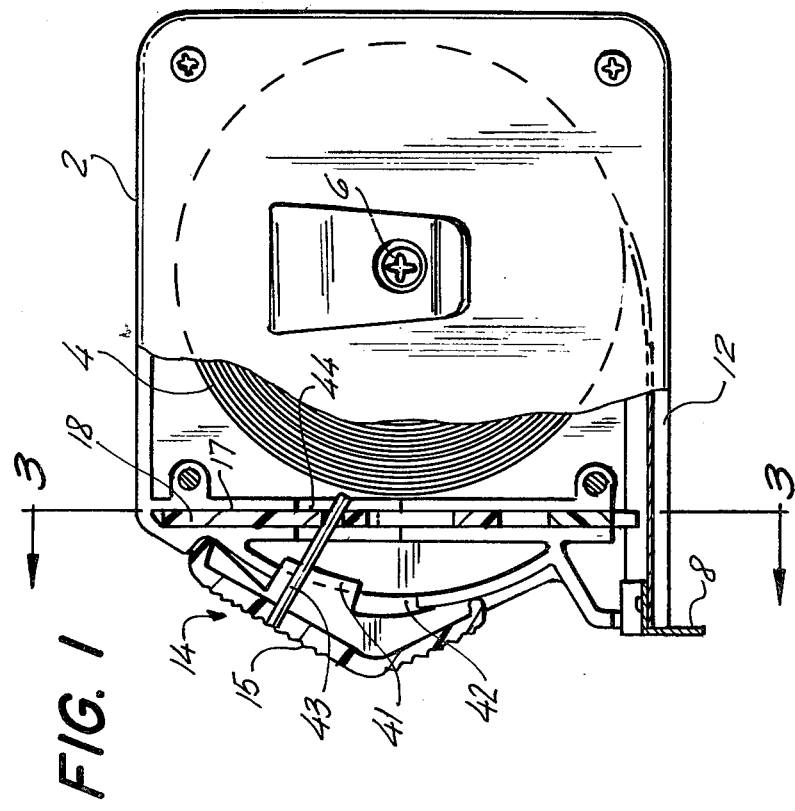
FIG. 1 is a side view of one embodiment of the invention with the left-hand portion of the casing cut away.
Figure 6:
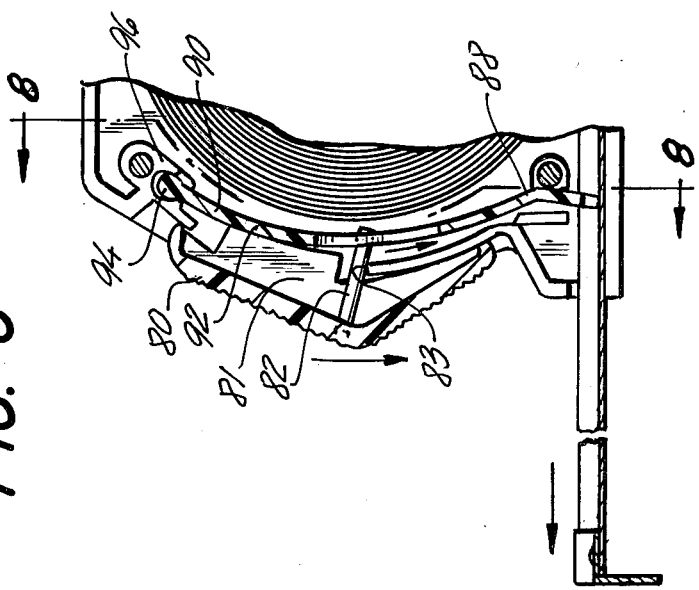
Figure 5:
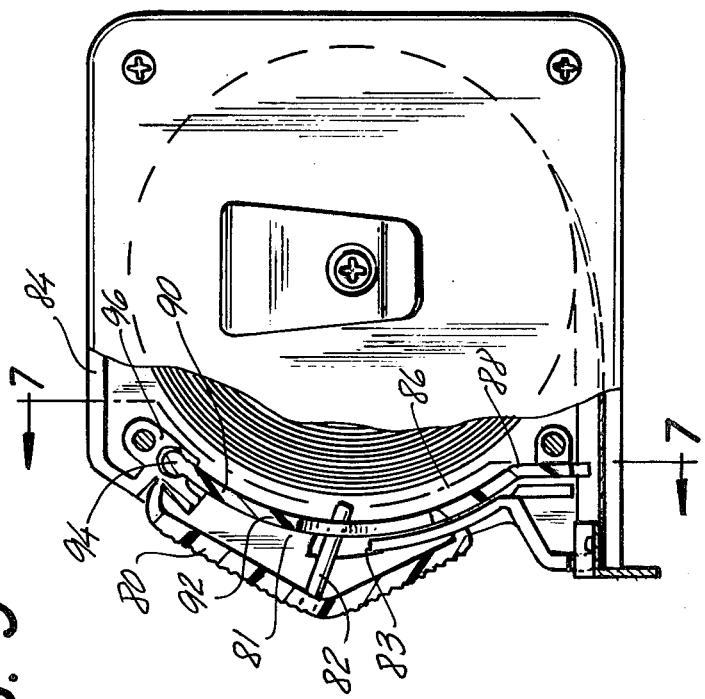
Figure 7:
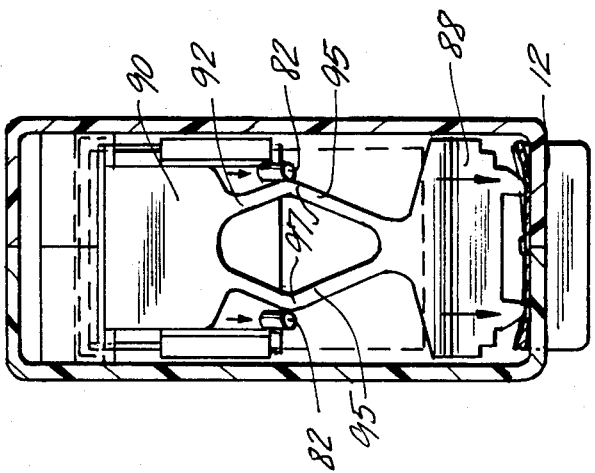
Figure 8:
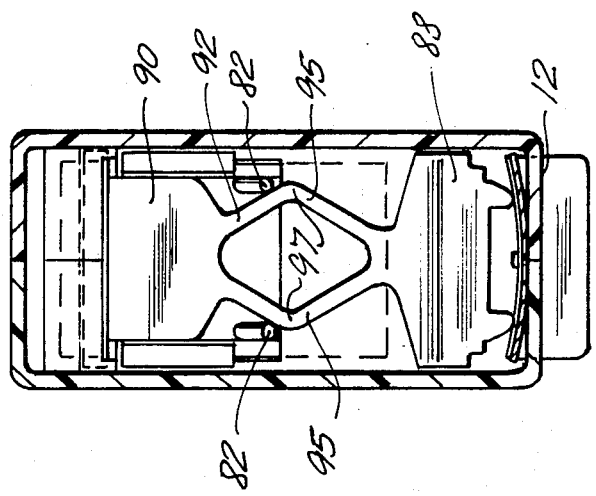

FIGS. 3 and 4 are views respectively on the lines 3—3 of FIG. 1 and 4—4 of FIG. 2;

FIGS. 5 and 6 are similar to FIGS. 1 and 2, but show another embodiment of the invention; and, FIGS. 7 and 8 are sectional views respectively on the lines 7—7 of FIG. 5 and 8—8 of FIG. 6.

Referring to FIG. 1 of the drawings, a rigid plastic casing 2 encloses a tape 4 which is wound onto a reel (not shown) having an axis 6 and enclosing a rewind spring (not shown). Attached to the end of tape 4 is a tape hook 8 which is held against the casing wall by the coil spring when the tape is fully wound, and which is engaged to withdraw the tape from the casing. As the tape moves to and from the casing it slides along the top surface of the bottom casing wall 12.

A tape-locking mechanism 14 is provided having a thumb actuated slide 15 mounted on the front wall of the casing with limited sliding movement up and down the casing wall. This mechanism includes a locking assembly (see FIG. 3) formed of two flat plastic members comprising a locking member 16 and an operating member 18, lying in the same plane in a channel 17 formed in the housing with their side edges guided for sliding movement by the sidewalls of channel 17.

Locking member 16 has a rectangular body portion 20 with a pair of downwardly extending feet 22 which are adapted to engage and lock the tape. In addition, member 16 has two inwardly extending angle arms 24.

The plastic of which members 16 and 18 are formed permits arms 24 to flex from the relaxed position out of engagement with the casing sidewalls 49, but they return to that normal position when not engaged by operating member 18. Each of the angle arms has two portions of equal length and extends upwardly from body portion 20 with the two lower arm portions extending toward each other, and the upper portions extending away from each other to near engagement with the sidewalls of the casing.

Operating member 18 has a main rectangular body portion 30 and a downwardly projecting operating portion 32 which projects between arms 24. When the mechanism is positioned as shown in FIG. 3, the tape is not locked. A pair of cam surfaces 34 of operating portion 32 are parallel respectively with the top surfaces 36 of the upper portions of arms 24, and surfaces 38 on the bottom of operating portion 32 are respectively parallel to surfaces 40 of the lower portions respectively of arms 24. Referring to FIGS. 1 and 2, the movement of slide 15 is limited by a stop 41 which projects into a slot 42 in the casing wall. Mounted rigidly in slide 14 is an operating pin 43 which has a free end that projects through a hole 44 in operating member 18. Hence, when slide 15 is slid down, it moves operating member 18 from the position of FIG. 1 in which the tape is not locked to the position of FIG. 2 in which the tape is locked. During that movement, surfaces 34 engage surfaces 36 of the upper portions of arms 24 of locking member 16 as shown in FIG. 3, and upon further movement of the operating member, surfaces 34 engage the angle portions 35 of arms 24, and then the parallel side surfaces 37 engage angle portions 35. The bottom surface 45 of the operating member is also moved into engagement with the top surface 46 of the body portion 20 of locking member 16, and the locking member is pushed downwardly to the position of FIG. 4 in which the tape is locked. Simultaneously, arms 24 are pushed in opposite directions against the casing sidewalls, and the top ends of the arms are pushed outwardly below ledges 48 in the casing sidewalls 49. The ends 50 are tapered so as to provide secure engagement with ledges 48. The engagement of arms 24 with ledges 48 holds the locking member in the locking position as long as arms 24 are held apart by surfaces 37. The movement of slide 15 back to the position of FIG. 1 permits arms 24 to move back to their normal position of FIG. 3 so that they no longer hold the locking member in the position of FIG. 4. Surfaces 38 on the lower portion of operating portion 32 also engage surfaces 40 and lift the locking member 16 upwardly so that the locking member no longer engages the tape.

The embodiment of FIGS. 5 to 8 is similar in many respects to that of the embodiment of FIGS. 1 to 4 and the identical components are numbered the same.

Referring to FIGS. 5, 7 and 8, a slide 80 has two pins 82 which are positioned adjacent to the sidewalls of casing 84 and which extend through a slot 83 in the front wall of the casing. A locking member 86 has a bottom locking portion 88, a top portion 90 and a central expandable portion 92. An integral cylindrical anchor 94 is snugly received at its ends in pockets 96 formed in the sidewalls of the casing. The front wall of the casing is a segment of a cylinder, and locking member 86 is formed and positioned to extend along the front wall from its anchor portion 90 to its bottom locking portion 88. The central portion 92 has two angle arms 95 which form a "diamond" shape with the maximum width being at the angle portions 97 of the two arms. When the tape is unlocked, slide 80 is in its upper position, and it is slid downwardly to lock the tape. The movement of slide 80 is limited by an integral portion or tongue 81 which projects into a slot 83 in the front wall of the casing.

In the unlocked position, pins 82 are positioned (FIG. 7) directly above the upper angle portions of arms 95, and when the slide 80 is pushed downwardly the pins move to and slightly beyond the joint or angle portions 97 of the arms. During that movement, the vertical dimension of angle arms 95 and therefore of locking member 86 is increased sufficiently to push feet 22 on locking portion 88 into engagement with the tape and to lock the tape against the bottom wall 12. The fact that pins 82 are below the center of angle portions 97 insures that slide 80 will remain in that position, and the tape remains locked until the slide is moved back up to the position shown in FIG. 5. That return movement of the slide moves pins 82 from the position of FIG. 8 to that of FIG. 7 so that arms 95 return to their normal position and the locking member moves out of engagement with the tape.

Each of the constructions which are disclosed operates in an efficient manner to lock and unlock the tape. The combination of the pair of angular arms with the cam operation reduces the operating force required. That produces a "leverage" effect which multiplies the force required to move the slide to the greater force which is required to lock the tape against the casing wall and hold the slide in its locked position.

In FIGS. 1 to 4, the angle arms are secured in their elongated "tape-locking" positions by the parallel side edges 37 pressing transversely against the angle portions 35 of arms 24. A similar result is provided in FIGS. 5 to 8 by moving pins 82 slightly past the center of the angle portions of the angular arms. The ledges 48 in FIGS. 1 to 4 provide an "anchor" for the angular arms, but the arms are still free to move upwardly when they move toward each other to their rest positions.

It is understood that modifications can be made in the illustrative embodiments of the invention and that the various aspects thereof can be used separately or together all within the scope of the claims.

What is claimed is:

1. In a measuring tape assembly, the combination of, a measuring tape, a casing in which said tape is coiled, said casing having a plurality of walls including a front wall with a slot at its bottom through which said tape is withdrawn from and returned to said casing, and locking means for clamping said tape to a wall of said casing adjacent said slot and comprising a locking assembly and operating means, said locking assembly including a locking portion for clamping said tape against said wall and a pair of substantially identical angle arms integral therewith and projecting generally upwardly therefrom, each of said angle arms being formed by upper and lower portions interconnected by a joint portion and extending at an angle to each other toward a sidewall of said casing, said operating means comprising means for exerting cam actions in opposite directions upon said joint portions to thereby change the angular relationships between the upper and lower portions of said angle arms and the effective length of said angle arms, thereby to urge said locking portion against the tape.

2. The measuring tape assembly as described in claim 1 wherein said operating means includes a slide mounted upon said front wall, and means extending through said front wall and transmitting movement of said slide to said locking assembly.

3. The measuring tape assembly as described in either of claims 1 or 2 wherein said locking portion has a bottom portion which is adapted to press said tape against the adjacent wall of said casing.

4. The measuring tape assembly as described in claim 1 wherein said angle arms extend from said locking portion upwardly toward each other and thence away from each other, and means in said casing forming ledges which are engaged by the ends of said angle arms when said locking portion is positioned so that said tape is clamped whereby said angle arms hold said locking portion against the tape.

5. The measuring tape assembly as described in claim 4 wherein said means for exerting cam actions has cam surfaces which engage said angle arms adjacent said joint portions.

6. The measuring tape assembly as described in claim 1 which includes a slide member mounted upon said front wall and a pair of pins rigidly mounted on said slide and extending through said front wall and operatively engaging said angle arms, said pins moving said arms toward each other when engaging said arms adjacent said joint portions thereby to increase the length of said arms and move said locking portion to lock said tape.

7. The measuring tape assembly as described in either of claims 1 or 6 wherein said locking assembly comprises an integral member including said locking portion, said angle arms, and a top portion connecting said angle arms at the ends thereof opposite said locking portion.

8. The measuring tape assembly as described in claim 7 wherein said angle arms converge toward each other from said joint portions toward said locking and top portions.

9. In a measuring tape assembly in which a tape is coiled in a casing and is withdrawn from and returned to its coiled condition, a locking mechanism which is operative to lock the tape from movement to and from the casing and which comprises, the combination of, a locking element having a body portion with means to engage the tape and to exert downward pressure thereon, two angle arms attached to said body portion and extending upwardly therefrom in the same vertical plane with upper and lower portions of each arm being at an angle to each other and being interconnected by an angle portion, said angle portions being in spaced opposed relationship to each other with said lower portions of the arms diverging from each other and said upper portions of the arms diverging from each other, and operating means which includes cam means positioned to be moved between and along said angle portions and to exert forces in opposite directions thereon and to push said angle portions away from each other, and means in said casing positioned upon the opposite sides of said arms and having ledges against which the ends of said arms are urged to thereby prevent said ends from moving upwardly, said cam means presenting cam surfaces which engage said arms and increase the angular relationship between the respective upper and lower portions of each of said arms and thereby increase the overall length of said arms to move said body portion toward the tape-locking position, said operating means including means to move said cam means.

10. The measuring tape assembly as described in claim 9 wherein said means to move said cam means includes a slide operatively mounted upon said casing and a pin operatively connecting said slide to said cam means.

11. In a measuring tape assembly in which a tape is coiled in a casing and is withdrawn from and returned to its coiled condition, a locking mechanism which is operative to lock the tape from movement to and from the casing and which comprises, the combination of, a locking element having a body portion with means to engage the tape and to exert downward pressure thereon, two angle arms attached together and to the central upper portion of said body portion and extending upwardly therefrom in the same vertical plane with upper and lower portions of each arm being at an angle to each other and being interconnected by an angle portion and being connected at their lower ends and diverging upwardly from each other and said upper portions being connected at their upper ends and diverging downwardly from each other, and operating means having means positioned upon the opposite sides of said upper portions of said arms and mounted to be moved downwardly along said angle portions and to move said angle portions toward each other to elongate said arms vertically and thereby move said body portion to the tape-locking position.

12. The measuring tape assembly as described in claim 11 wherein said operating means comprises a slide mounted upon said casing.

* * * * *